United States Patent [19]

Brown et al.

[11] Patent Number: 5,395,536
[45] Date of Patent: Mar. 7, 1995

[54] WASTEWATER ORGANIC ACID REMOVAL PROCESS

[75] Inventors: William M. Brown, Benicia, Calif.; Maria Trevino, Katy, Tex.

[73] Assignee: Baker Hughes, Inc., Houston, Tex.

[21] Appl. No.: 57,879

[22] Filed: May 7, 1993

[51] Int. Cl.$^6$ ............................................. C02F 1/56
[52] U.S. Cl. ................................. 210/727; 210/728; 210/734; 210/735; 210/736; 210/908
[58] Field of Search ............... 210/634, 638, 639, 708, 210/725, 728, 727, 734, 735, 736, 908

[56] References Cited

U.S. PATENT DOCUMENTS

| | | | |
|---|---|---|---|
| 3,953,330 | 4/1976 | Tonkyn et al. | 210/728 |
| 4,026,794 | 5/1977 | Mauceri | 210/708 |
| 4,655,934 | 4/1987 | Rose et al. | 210/736 |
| 4,818,410 | 4/1989 | Bellos et al. | 210/708 |
| 5,128,046 | 7/1992 | Marble et al. | 210/708 |
| 5,236,591 | 8/1993 | Hart | 210/708 |

FOREIGN PATENT DOCUMENTS 473680  9/1975  U.S.S.R. .............................. 210/634

OTHER PUBLICATIONS

W. A. Derungs, "Naphthenic Acid Corrosion—An Old Enemy of the Petroleum Industry," *Corrosion*, vol. 12, Dec. 1956, pp. 41–46.
English Abstract of S. Honda, et al., "Treatment of Waste Water Containing Oil (II) Removal of Dispersed Oil in Water by Using Metal Hydroxide," 1965 Rept. Govt. Ind. Res. Inst., Osaka, Japan, vol. 16, No. 1, p. 27.
M. G. Negulescu, et al., "Aspects Concerning the Treatment of Wastewaters from Oil Refineries in Romania," *Advan. Water Pollut. Res., Proc. Int. Conf. 3rd*, 1967, 2, pp. 229–260.
J. M. Courtney, III, et al., "Experimental Study of the Effectiveness of Aluminum Chloride for Clarifying Wastewater," *Proceedings of Mid–Atlantic Industrial Waste Conference 16th*, Technomic Publ. Co. Lancaster, Pa., 1984, pp. 343–350.
R. P. Kisciras, et al., "Comparative Performance of Aluminum Chloride, Poly-aluminum Chloride and Blends in Wastewater Clarification," *Proceedings of Mid–Atlantic Industrial Waste Conference 17th*, Technomic Publ. Co. Lancaster, Pa, 1985, pp. 156–165.
N. Parthasarathy, et al., "Study of Polymeric Aluminium(III) Hydroxide Solutions for Applications in Waste Water Treatment Properties of the Polymer and Optimal Conditions of Preparation," *Water Res.*, vol. 19, No. 1, pp. 25–26, 1985.
E. S. Lower, "Naphthenic Acid," *Specialty Chemicals*, vol. 7, No. 5, Apr. 1987, pp. 76–83.
E. S. Lower, "Napththenic Acid," *Specialty Chemicals*, vol. 7, No. 5, Apr. 1987, pp. 282–284.
I. Dzidic, et al., "Determination of Naphthenic Acids in California Crudes and Refinery Wastewaters by Fluoride Ion Chemical Ionization Mass Spectrometry," *Analytical Chemistry*, vol. 60, No. 13, Jul. 1, 1988, pp. 1318–1323.
A. K. Zapol'skii, et al., "Effect of Aluminum Hydroxochloride on Stability of Water–Oil Emulsions," *Khimiya i Tekhnologiya Vody*, vol. 10, No. 2, pp. 112–114, 1988.
Z. K. Chowdhury, et al., "Coagulation of Submicron Colloide in Water Treatment by Incorporation into Aluminum Hydroxide Floc," *Environ. Sci. Technol.*, vol. 25, No. 10, 1991, pp. 1766–1773.
E. Babaian-Kibala, et al., "Naphthenic Acid Corrosion in Refinery Settings," *MP*, Apr. 1993, pp. 50–55.

*Primary Examiner*—Peter A. Hruskoci
*Attorney, Agent, or Firm*—Rosenblatt & Associates

[57] ABSTRACT

A process for removing carboxylic acids from aqueous solutions using a composition of a polyaluminum chlorohydrate and a cationic polyelectrolyte is described. After or during the initial contact of the aqueous solution with the composition, an organic liquid may optionally be added after which separation into an aqueous phase and an organic phase occurs whereby the organic acids are removed in the organic phase. The preferred polyaluminum chlorohydrate is aluminum chlorohydrate, and the preferred cationic polyelectrolyte is a high molecular weight poly(dimethyl diallyl) ammonium chloride.

17 Claims, No Drawings

WASTEWATER ORGANIC ACID REMOVAL PROCESS

FIELD OF THE INVENTION

The invention relates to methods for removing organic acids from aqueous solutions and, in one aspect, more particularly relates to removing organic acids from aqueous solutions using polymetal halides.

BACKGROUND OF THE INVENTION

Carboxylic acids are recognized to be highly toxic to marine life. In the refining industry, they are commonly referred to as organic acids and are generally a mixture of saturated higher fatty acids. They are also often incorrectly grouped together as naphthenic acids or simply "nap acids". For refineries processing "high neutralization number" crudes such as California and some Gulf crudes, even very low levels of organic acids can result in a refinery's inability to meet aquatic compliance requirements on effluent waters. Rainbow trout fry are particularly sensitive to such compounds.

Carboxylic acids are classified by the chemical structure R—COOH. In this acid form, they are fully hydrocarbon soluble and generally water insoluble. Only those organic acids with a carbon count of five or less exhibit any water solubility. However, an important characteristic of organic acids is that alkali metal salts of these compounds are readily soluble in water and insoluble in hydrocarbon media. That is, carboxylic acids and their alkali metal salts show opposite solubility behavior.

Certain crude oils thus contain organic acids which are typically present as salts such as sodium or calcium naphthenates. During the raw crude desalting process, these water-soluble (alkali metal) salts are extracted into the resulting tail water. A number of refineries have dealt with such undesirables by removing them through an extractive process wherein the acid-laden stream is first acidified with $H_2SO_4$ to a pH of less than 2.0 in order to convert the salts into the oil-soluble acid form. While still in the acid phase, the aqueous stream is then extracted with a "sponge" oil (diesel or similar distillate) thereby removing the organic acids from the water stream. The pH of the water is then adjusted back up to neutrality for subsequent handling in the wastewater system.

While reasonably effective, this process has several drawbacks. First, the low pH precludes the use of carbon steel and dictates the use of more expensive, stainless steel metallurgies. Second, because of crude impurities and emulsion stabilizers, the acid-laden sponge oil is typically rather wet (up to 40% water) and can release naphthenate-laden water upon separation when mixed with higher pH waters in tankage. This can result in the re-introduction of organic acid species into the effluent water system. Lastly, the acidification step can result in the potential release of $H_2S$ vapors that could impose significant potential health hazards. The solutions to be treated may already possess some level of $H_2S$ and the use of sulfuric acid would only increase this ancillary treatment problem.

It would be desirable if a method could be discovered which would remove organic acids from aqueous solutions without these attendant disadvantages.

SUMMARY OF THE INVENTION

Accordingly, it is an object of the present invention to provide a method for removing organic acids from aqueous solutions.

It is another object of the present invention to provide a method for organic acid removal which does not require lowering the pH of the aqueous stream and thus does not require the use of stainless steels.

A further object of the invention is to provide a technique of removing organic acids from aqueous systems which does not release hydrogen sulfide ($H_2S$) gas or at least greatly minimizes its release. Since many of these streams contain significant concentrations of soluble sulfides, their direct acidification significantly increases the release of this toxic gas. The invention avoids this disadvantage.

In carrying out these and other objects of the invention, there is provided, in one form, a process for removing soluble carboxylic acids from aqueous solutions involving contacting an aqueous solution containing the alkali metal salts of carboxylic acids with an effective amount of a polyaluminum chlorohydrate.

DETAILED DESCRIPTION OF THE INVENTION

In theory, there are at least two methods for the extraction of soluble organic acid salts from aqueous systems which do not require acidified separation. One method would be to convert the soluble salt to an insoluble form through precipitation as a metal salt. It is a fact that most of the heavy metal salts of carboxylic acids are completely insoluble in water. Metals such as iron or aluminum are inexpensive and readily available for such purposes. While the use of either metal will produce solids that must be dealt with, the disadvantage of iron is that it may produce significantly more solids (e.g. FeS, elemental sulfides) in sulfide-containing streams such as those encountered in desalting processes.

Another possible mechanism for the removal of soluble organic acid salts would be the preferential partitioning of these materials into a hydrocarbon phase as a result of chemical treatments used to initially separate the hydrocarbon and aqueous phases.

It has discovered that relatively high molecular weight, fatty organic, soluble acids can be removed with the use of some forms of aluminum chloride by precipitation. These materials have been used previously for the removal of insoluble contaminants and particulates, but are unknown for the removal of these soluble organic acids.

It has been additionally surprisingly found that a blend or composition of a polyaluminum chlorohydrate and a cationic polyelectrolyte is particularly effective for removing organic acids from aqueous solutions, such as wastewaters from crude oil refining operations. When in aqueous solutions these acids are in alkali metal salt form.

In one embodiment of the invention, the only active component is a type of inorganic salt known as polyaluminum chloride (PAC). PACs can be described by the equation formula shown below:

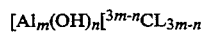

where m ranges from 2 to 6; n ranges from 2 to 18. In the present invention, a particularly preferred PAC is aluminum chlorohydrate. In this form, m=2, n=5 and 3m-n=1. While this particular PAC has been shown to be most effective in laboratory studies, field work has demonstrated that other stable PACs may be equally or more effective under certain conditions. For this reason, the current invention should not be limited to the aluminum chlorohydrate form described, but should include all PACs as a class indeed, blends of PACs are useful in the method of this invention.

The proportion of the polyaluminum salt in the blend composition is from about 10 to about 50 wt. % of the blend, preferably about 45 to 50 wt. %.

In another embodiment of the invention, the PAC is part of a composition where the other main component of the composition is a cationic polyelectrolyte. This component is believed to act as a flocculant for the coagulated microfloc formed by the polyaluminum chlorohydrate with the organic acids. The proportion of the cationic polyelectrolyte is from about 0 to about 25 wt. % of the blend, preferably about 0.75 to about 1.0 wt. %. The cationic polyelectrolyte has a mean molecular weight of from about 50,000 to about 1,000,000, and preferably from about 500,000 to about 750,000. A number of electrolytes are believed to be useful in the blend of the present invention, including but not limited to poly(dimethyl allyl) ammonium chloride, dimethylamine epichlorohydrin, polyquaternary amines and cationic polyacrylamides. Poly(dimethyl allyl) ammonium chloride is a particularly preferred polyelectrolyte. The balance of the blend may be water.

There are a number of complex factors which affect the amount of the blend which should be used to remove organic acids from an aqueous solution including, but not limited to, the amount and form of organic acids present, the quantity and nature of other hydrocarbons present in the stream, and other physical chemical properties such as temperature and pH. It is thus very difficult to specify with precision what the dosage level should be. However, in one embodiment of the invention, the amount of blend that should be used may range from about 2500 to about 8000 ppm, preferably about 2500 to about 3000 ppm.

An organic liquid is used to extract the organic acid-containing species from the aqueous solution by any of various conventional means. The organic liquid may include, but is not limited to, diesel oil, mineral oils or other paraffinic solvents. The organic liquid may be optionally added after or during initial contact of the aqueous solution with the composition containing the polyaluminum chlorohydrate.

If the aqueous solution contains $H_2S$, such as wastewaters from crude oil operations often do, it may be appropriate to inject into the aqueous stream a $H_2S$ scavenger subsequent to the blend of this invention.

The invention will be described further with respect to the following Examples which are not intended to limit it in any way, but simply illuminate the invention further.

Acid Turbidity Test

This test method is a means of gauging the soluble organic acid (salts) content of an aqueous sample. The method is based on the physical property of organic acids wherein the water soluble salts can be rendered insoluble by pH depression. Upon lowering the pH, the organic acid salts become insoluble and result in turbidity that can be measured on a conventional turbidimeter. Because of its relative simplicity, this method was employed to screen and evaluate potential chemical treatment strategies.

Using this procedure, a prepared sample is first filtered to remove any water insoluble components. A turbidity measurement is then run on the filtrate to establish a "baseline". The sample aliquot is then acidified to a pH of less than 2.0 with concentrated $H_2SO_4$ and re-run for turbidity. The net increase in turbidity is a relative measure of naphthenate concentration that was present in the original sample. This test method is a fast and simple means for bench screening the effectiveness of various treatment strategies.

Interference Removal Method

Process streams, such as desalter tail water or water heels on sponge oil storage vessels, often contain a wide variety of inorganic compounds that can interfere with the Acid Turbidity test. Such constituents can either produce baseline turbidity that will dissipate upon acidification or produce additional turbidity when the pH is depressed.

The presence of interference dictated the need to develop a sample pretreatment method. Interference removal was accomplished by the development of an acidified extraction process that involves the following key steps:

1) An aqueous sample is first acidified to pH <2.0 in order to convert the acid salts to a hydrocarbon-soluble form.
2) An aliquot is then extracted with diesel to capture the carboxylic acids in the hydrocarbon phase, leaving the inorganic interferences behind in the aqueous phase.
3) An aliquot of this acid-laden diesel is then washed with a sodium hydroxide solution to extract sodium salts of the acids back into an aqueous phase.

Overall Procedure

A. Dosage Additions/Sample Treatment (Performed in hood or outside)
  1. Put about 120 ml of raw sample in 250-ml Erlenmeyer flask.
  2. Use 1-ml syringes to add treatment chemical(s).
  3. If called for, use pH meter to measure result of chemical additions.
  4. Transfer flask contents into glass separatory funnel.
  5. Use 5- or 10-ml syringe to add desired % diesel.
  6. Shake 200 shakes, venting after the first 50 shakes.
  7. Allow to stand, form floc and separate.
  8. Drain water phase through a Whatman #4 filter into another 250-ml flask. To get maximum water volume recovery, it is permitted to pull most all of the floc into the filter paper as floc will filter out.
  9. Immerse pH electrode in flask containing filtrate and add 50% $H_2SO_4$ dropwise until pH is below 2.0.
  10. Measure 100 mls of this in a clean graduate for use in the Interference Removal procedure.

B. Interference Removal Procedure
  Acidified Extraction:
  1. Take 100 mls from Step 10. above and place in a solvent resistant plastic or glass separatory funnel.
  2. Measure 100 ml of diesel and add to separatory funnel.

3. Shake vigorously for 200 shakes to mix, venting after the first 50 shakes.
4. Allow to stand until separated.
5. Drain off and dispose of the water phase including any interfacial rag or emulsion.
6. Drain diesel phase through a Whatman #4 filter into a 100 ml graduate.
7. Accumulate 80 ml for use in caustic wash procedure shown below.

Caustic Wash:
1. Prepare NaOH solution with 5 drops 5N NaOH in 200 ml deionized water.
2. Transfer 80 ml of diesel from Step 7 above into second separatory funnel.
3. Add 80 ml of NaOH solution from Step 1 to separatory funnel.
4. Shake vigorously for 200 shakes to mix, venting after the first 50 shakes.
5. Allow to stand until separated.
6. Drain water phase through a pre-wetted Whatman #5 filter into a 4 oz. bottle.
7. Proceed to Acid Turbidity test.

C. Acid Turbidity Test
1. Pour 25 ml of interference-free sample into cuvette tube.
2. Measure turbidity.
3. Remove cuvette from meter and add six drops of 1:1 $H_2SO_4$ to "spring" acids.
4. Measure turbidity again.
5. Step #4 result minus Step #2 result equals Net NTUs of organic acids.
6. Calculation of corrected result:

Corrected value = Net $NTUs \times \frac{\text{ml caustic wash}}{\text{ml original sample}} \times$ $\frac{\text{ml diesel in acid wash}}{\text{ml diesel in caustic wash}}$ Results of the tests are reported in Table I.

TABLE I

Acid Turbidity Results

Field Sample

| Ex. | IPC 6015 Treatment | Dilution Ratio | Percent Diesel | Acidified Turbidity | % Below Blank |
|---|---|---|---|---|---|
| 1 | Blank | 1:5 | 5 | 650 | 0 |
| 2 | 3000 ppm | 1:5 | 5 | 94 | 85.5 |
| 3 | 5000 ppm | 1:5 | 5 | 34 | 94.7 |
| 4 | 5000 ppm + 2000 ppm Sulfix 400 | 1:5 | 5 | 200 | 69.2 |

| Ex. | IPC 6005 Treatment | Dilution Ratio | Percent Diesel | Acidified Turbidity | % Below Blank |
|---|---|---|---|---|---|
| 5 | Blank | 1:5 | 10 | 620 | 0 |
| 6 | 5,500 ppm | 1:5 | 10 | 12 | 98.1 |

Lab Sample:
250 ppm Commercial Napthenic Acid[1] in Deionized Water

| Ex. | IPC 6015 Treatment | Dilution Ratio | Percent Diesel | Acidified Turbidity | % Below Blank |
|---|---|---|---|---|---|
| 7 | Blank | Neat | 5 | 300 | N/A |
| 8 | Blank | 1:1 | 5 | 325 | 0 |
| 9 | 5000 ppm | 1:1 | 5 | 98 | 69.9 |
| 10 | 6000 ppm | 1:1 | 5 | 75 | 76.9 |
| 11 | 7000 ppm | 1:1 | 5 | 70 | 78.5 |

[1]Commercial Napthenic Acid = Mooney Chemical #27059 (acid no. 175).

Findings

The data detailed in Table I confirmed the ability of polyaluminum chloride to effect an extremely efficient removal of soluble naphthenates from process waters. It is speculated that the aluminum cation is functioning to replace the sodium (or calcium) cation to result in an insoluble aluminum naphthenate precipitate.

This method offers an advantage over acidified extraction as a strategy for organic acid removal in that it does not require pH depression. The use of carbon steel equipment is allowed, unlike the acidified extraction that requires stainless steel.

Field Applicability

The proposed field process involves the stepwise addition of a product of this invention such as IPC-6015, and then diesel (at about 2–5%) into an aqueous stream in transit to a separation vessel (tank, Baker box, etc.). Following the diesel addition, mixing is induced via in-line static mixing, line turbulence and/or centrifugal pump. This mixing allows the diesel to "oil wet" the particulates so as to give them buoyancy to ensure flotation. Physical separation is accomplished in the receiving vessel where the floc is pulled off from the top for centrifuging or filter pressing, and the acid-free water is discharged from the bottom.

Example 12

In another example of the invention, water separated from a slop oil at a refinery was treated as described with 2800 to 3000 ppm of IPC 6015 and 3.7–4.0 wt. % diesel oil. Initial Total Organic Carbon (TOC) in this water was approximately 6500 ppm with an initial acidified turbidity of 2300 NTU. Water analysis after the treatment showed a final TOC of 650 ppm and acidified turbidity of 215 NTU. This shows a reduction of 90% and 90.7% in TOC and acidified turbidity, respectively. Unacidified water turbidity after treatment was less than 20 NTU.

It should be recognized that the addition of acidic polyaluminum chloride solutions to sulfide-containing process waters can alter the chemistries such that $H_2S$ gas can be evolved. Depressing the pH by as little as one pH unit can produce $H_2S$ gas. Lower pHs will produce increasing rates of gas evolution. Hence, an $H_2S$ scavenger may be added to the separated water to react with $H_2S$ and prevent evolution and potential health hazards.

As shown in the prior Example, the utilization of IPC-6015 as the aluminum chloride source incorporates the benefits of polymer chemistry in conjunction with the diesel properties to enhance coagulation and flotation. Additionally, this combination in IPC-6015 produces very effective TOC (total organic carbon) removal which can be equally important to wastewater treatment and fish toxicity.

Many modifications may be made in the present invention without departing from the spirit and scope thereof which are defined only by the appended claims. For example, a routineer in the art may discover that a particular polyaluminum chlorohydrate and particular cationic polyelectrolyte combination not explicitly mentioned herein may have particular advantage.

| GLOSSARY | |
|---|---|
| IPC 6005 product | An aqueous blend of polyaluminum chlorides (PACs) which have the general chemical formula of $[Al_m(OH)_n]^{3\ m-n}Cl_{3\ m-n}$, where m ranges from 2 to 6 and n ranges from 2 to 18, sometimes abbreviated herein as 6005, made by Chemlink, Inc. |

-continued

GLOSSARY

| | |
|---|---|
| IPC 6015 product | A blend of a PAC and a cationic polyelectrolyte in water. The particular polymer used is a high molecular weight poly(dimethyl diallyl) ammonium chloride (1.0 wt. %) and the particular PAC is aluminum chlorohydrate (47.5 wt. %), sometimes abbreviated herein as 6015, made by Chemlink, Inc. |
| NTU | A unit of turbidity measurement: nephelometric turbidity unit. |
| Sulfix ® 400 product | A H$_2$S scavenger product having a dibutyl aminocarbinol as the active compound, sometimes abbreviated herein as S-400, made by Chemlink, Inc. |

We claim:

1. A process for removing soluble alkali metal naphthenates from aqueous solutions in the absence of acidification of said aqueous solutions, comprising the steps of:

contacting an aqueous solution containing soluble alkali metal naphthenates with an amount effective to precipitate the alkali metal naphthenates of a composition comprising about 10 to 50 wt. % of at least one polyaluminum chlorohydrate, the balance being water;

forming a precipitate with the alkali metal naphthenates and the polyaluminum chlorohydrate in an aqueous phase; and separating the aqueous phase from the precipitate.

2. The process of claim 1 where in the composition the polyaluminum chlorohydrate comprises at least aluminum chlorohydrate, [Al$_2$(OH)$_5$]Cl.

3. The process of claim 1 where the effective amount of the composition in the aqueous solution ranges from about 2000 to 8000 ppm.

4. The process of claim 1 where a paraffinic oil is added to the aqueous solution during or after contacting of the aqueous solution with the composition.

5. The process of claim 4 where the paraffinic oil is selected from the group consisting of diesel oil and mineral oils.

6. A process for removing soluble alkali metal naphthenates from aqueous solutions in the absence of acidification of said aqueous solutions, comprising the steps of:

contacting an aqueous solution containing soluble alkali metal naphthenates with an amount effective to precipitate the alkali metal naphthenates of a composition comprising:

about 10 to 50 wt. % of at least one polyaluminum chlorohydrate, about 0.75 to 25 wt. % of at least one cationic polyelectrolyte, and;

the balance being water;

forming a precipitate with the alkali metal naphthenates and the polyaluminum chlorohydrate in an aqueous phase; and separating the aqueous phase from the precipitate.

7. The process of claim 6 where in the composition the polyaluminum chlorohydrate comprises aluminum chlorohydrate, [Al$_2$(OH)$_5$]Cl.

8. The process of claim 6 where in the composition the cationic polyelectrolyte is selected from the group consisting of poly(dimethyl diallyl) ammonium chloride, dimethylamine epichlorohydrin, polyquaternaryamines, cationic polyacrylamides and mixtures thereof.

9. The process of claim 6 where the cationic polyelectrolyte has a molecular weight of from about 50,000 to about 1,000,000.

10. The process of claim 6 where the effective amount of the composition in the aqueous solution ranges from about 2000 to 8000 ppm.

11. The process of claim 6 where a paraffinic oil is added to the aqueous solution during or after contacting of the aqueous solution with the composition.

12. The process of claim 6 where the paraffinic oil is selected from the group consisting of diesel oil and mineral oils.

13. A process for removing soluble alkali metal naphthenates from aqueous solutions in the absence of acidification of said aqueous solutions comprising the steps of:

contacting an aqueous solution containing soluble alkali metal naphthenates with an amount effective to precipitate the alkali metal naphthenates of a composition comprising:

about 45 to about 50 wt. % of at least one polyaluminum chlorohydrate, about 0.75 to about 1.0 wt. % of at least one cationic polyelectrolyte having a molecular weight of from about 500,000 to about 750,000, and;

the balance being water;

forming a precipitate with the alkali metal naphthenates and the polyaluminum chlorohydrate in an aqueous phase; and separating the aqueous phase from the precipitate.

14. The process of claim 13 where in the composition the polyaluminum chlorohydrate comprises aluminum chlorohydrate, [Al$_2$(OH)$_5$]Cl.

15. The process of claim 13 where in the composition the cationic polyelectrolyte is selected from the group consisting of poly(dimethyl diallyl) ammonium chloride, dimethylamine epichlorohydrin, polyquaternaryamines, cationic polyacrylamides and mixtures thereof.

16. The process of claim 13 where the effective amount of the composition in the aqueous solution ranges from about 2500 to 3000 ppm.

17. The process of claim 13 where a paraffinic oil selected from the group consisting of diesel oil and mineral oils is added to the aqueous solution during or after contacting of the aqueous solution with the composition.

* * * * *

UNITED STATES PATENT AND TRADEMARK OFFICE
CERTIFICATE OF CORRECTION

PATENT NO. : 5,395,536
DATED : March 7, 1995
INVENTOR(S) : Brown et al.

It is certified that error appears in the above-indentified patent and that said Letters Patent is hereby corrected as shown below:

At column 2, line 65, please delete "CL" in formula and insert therefor -- Cl --.

At column 3, line 8, please delete "class indeed," and insert therefor -- class. Indeed, --.

Signed and Sealed this

Eleventh Day of June, 1996

*Attest:*

BRUCE LEHMAN

*Attesting Officer*  *Commissioner of Patents and Trademarks*